(12) United States Patent
Nakamura et al.

(10) Patent No.: US 8,666,522 B2
(45) Date of Patent: Mar. 4, 2014

(54) CONTROLLER FOR MACHINE TOOL

(75) Inventors: Takayuki Nakamura, Nara (JP); Tetsushi Asada, Nara (JP); Takaaki Soga, Nara (JP)

(73) Assignee: Mori Seiki Co., Ltd., Nara (JP)

( * ) Notice: Subject to any disclaimer, the term of this patent is extended or adjusted under 35 U.S.C. 154(b) by 385 days.

(21) Appl. No.: 13/237,324

(22) Filed: Sep. 20, 2011

(65) Prior Publication Data

US 2012/0179284 A1    Jul. 12, 2012

(30) Foreign Application Priority Data

Jan. 12, 2011 (JP) ................................. 2011-003631

(51) Int. Cl.
*G05B 19/42* (2006.01)
*G06F 19/00* (2011.01)
*B25J 9/16* (2006.01)
*G05B 19/18* (2006.01)

(52) U.S. Cl.
USPC ............... 700/87; 700/88; 700/160; 700/178; 700/180; 318/568.1; 318/569

(58) Field of Classification Search
USPC ............... 700/86–89, 95, 117, 159, 160, 174, 700/175, 177, 178–181; 318/567, 568.1, 318/569–571
See application file for complete search history.

(56) References Cited

U.S. PATENT DOCUMENTS

| 4,456,960 | A  | * | 6/1984  | Wakai ......................... 700/175 |
| 5,274,562 | A  | * | 12/1993 | Suzuki ........................ 700/179 |
| 5,723,962 | A  | * | 3/1998  | Mizukami et al. ............ 318/571 |
| 6,397,111 | B1 | * | 5/2002  | Niwa ............................. 700/11 |
| 7,012,215 | B2 | * | 3/2006  | Mori ........................ 219/121.61 |
| 7,039,492 | B2 | * | 5/2006  | Sugiyama ..................... 700/181 |
| 7,110,851 | B2 | * | 9/2006  | Shimizu et al. .............. 700/181 |
| 8,036,770 | B2 | * | 10/2011 | Ichikawa ..................... 700/189 |

FOREIGN PATENT DOCUMENTS

JP         05241645 A   *  9/1993
JP         07-227739       8/1995

* cited by examiner

*Primary Examiner* — Crystal J Barnes-Bullock
(74) *Attorney, Agent, or Firm* — Miller, Matthias & Hull LLP (57) ABSTRACT

A controller for a machine tool has a program storage section in which an NC program is stored, a program analyzing section analyzing the NC program block by block in sequence and extracts operation commands for a feed mechanism, an execution control section executing the extracted operation commands and thereby controlling the feed mechanism, e program editing section changing the NC program, and a change information storage section in which change information relating to the changed portion of the NC program is stored. The execution control section, when executing the operation commands, checks whether the block of each operation command is the block immediately preceding a block relating to the changed portion, and when judging that it is the immediately preceding block, temporarily stops the operation of the feed mechanism before or after the execution of the operation command.

4 Claims, 8 Drawing Sheets

| Block | Text |
|---|---|
| ⋮ | ⋮ |
| 10 | N11 ; |
| 11 | G91 G28 Z0 ; |
| 12 | G91 G54 G17 G00 X95 Y26 ; |
| 13 | G43 X50 H501 S480 M03 ; |
| 14 | G01 Z3 F1000 ; |
| 15 | X-95 F500 ; |
| 16 | G00 Z50 ; |
| 17 | X-95 Y-46 ; |
| 18 | G01 Z1 F1000 ; |
| 19 | X-95 F500 ; |
| ⋮ | ⋮ |

Changed (block 15, 17, 19)

| Block | Text |
|---|---|
| ⋮ | ⋮ |
| 10 | N11 ; |
| 11 | G91 G28 Z0 ; |
| 12 | G91 G54 G17 G00 X95 Y26 ; |
| 13 | G43 X50 H501 S480 M03 ; |
| 14 | G01 Z3 F1000 ; |
| 15 | X-96 F500 ; |
| 16 | G00 Z50 ; |
| 17 | X-96 Y-46 ; |
| 18 | G01 Z1 F1000 ; |
| 19 | X-96 F500 ; |
| ⋮ | ⋮ |

FIG. 3

| Block | Text |
|---|---|
| ⋮ | ⋮ |
| 10 | N11 ; |
| 11 | T99 ; |
| 12 | G00 G54 G90 G40 X0 Y0 M03 S10000 ; |
| 13 | G43 Z60 H001 ; |
| 14 | G08 P01 ; |
| 15 | M08 ; |
| 16 | X-2.799 Y-32.27 ; |
| ⋮ | ⋮ |

| Number | Tool Length Compensation (H) | |
|---|---|---|
| | Shape | Wear |
| 001 | 10.500 | 1.230 |
| 002 | 0.006 | 0.000 |
| 003 | 0.015 | 0.006 |
| ⋮ | ⋮ | ⋮ |

Changed

| Number | Tool Length Compensation (H) | |
|---|---|---|
| | Shape | Wear |
| 001 | 10.200 | 1.120 |
| 002 | 0.006 | 0.000 |
| 003 | 0.015 | 0.006 |
| ⋮ | ⋮ | ⋮ |

| History Information | | |
|---|---|---|
| Program Name | Changed Portion | Execution State |
| 〇 0 0 0 1 | Yes | Executed |
| 〇 0 0 0 2 | No | — |
| 〇 0 0 0 3 | Yes | Not Executed |
| 〇 0 0 0 4 | Yes | Executed |
| 〇 0 0 0 5 | No | — |
| ⋮ | ⋮ | ⋮ |

| Executed Program | |
|---|---|
| Block | Text |
| ⋮ | ⋮ |
| 10 | N11 ; |
| 11 | G91 G28 Z0 ; |
| 12 | G91 G54 G17 G00 X95 Y26 ; |
| 13 | G43 X50 H501 S480 M03 ; |
| 14 | G01 Z3 F1000 ; |
| 15 | X-96 F500 ; |
| 16 | G00 Z50 ; |
| 17 | X-96 Y-46 ; |
| 18 | G01 Z1 F1000 ; |
| 19 | X-96 F500 ; |
| ⋮ | ⋮ |

CONTROLLER FOR MACHINE TOOL

TECHNICAL FIELD

The present disclosure relates to a controller for a machine tool for controlling a feed mechanism which relatively moves a tool and a workpiece. More specifically, the present disclosure relates to a controller for a machine tool configured to be capable of editing an NC program and a parameter.

BACKGROUND ART

As a controller for a machine tool, conventionally, the controller disclosed in the Japanese Unexamined Patent Application Publication No. 7-227739 is known, for example. This controller has a program storage section in which an NC program is stored, an override switch for changing, when the NC program stored in the program storage section is executed, a feed rate and a rotational speed of spindle which are commanded in the NC program, an override value storage section in which an override value of the override switch is stored, an editing section editing the NC program stored in the program storage section on the basis of the override value stored in the override-value storage section and thereby changing a feed rate and a rotational speed of spindle which are commanded in the NC program into the feed rate and the rotational speed of spindle which correspond to the override values.

In this controller, when the override switch is operated during the execution of the NC program, the then override value is stored in the override-value storage section and a command value (a feed rate or a rotational speed of spindle) in the NC program is changed into the command value corresponding to the override value.

Further, in addition to this controller, a controller having an editing function in which data is input directly by an operator and thereby a command value and a code, such as a feed rate, a rotational speed of spindle and a moving position, are changed and a parameter, such as tool offset amount and workpiece origin offset amount, is changed.

SUMMARY OF DISCLOSURE

However, in the above conventional controller, for example, there is a fear that, when a command value, a parameter or a code is changed, it is changed into a wrong or inappropriate value or a wrong code because of an error in changing. If an NC program including a wrong or inappropriate value or a wrong code is executed, there occur a problem that a tool interferes with a workpiece or a machine tool structure and a problem that the accuracy of workpiece machining is reduced.

According to the foregoing, a controller for a machine tool is capable of, when an NC program including a changed command value, parameter, or code is executed, machining a workpiece with safety without reducing machining accuracy.

A controller for a machine tool controlling a feed mechanism which relatively moves a tool and a workpiece may include:

a program storage section in which an NC program is stored;

a parameter storage section in which parameters for codes configuring the NC program are stored;

a program analyzing section for analyzing the NC program stored in the program storage section block by block in sequence and extracting operation commands for the feed mechanism;

an execution control section for, on the basis of the operation commands extracted by the program analyzing section in sequence and the parameters stored in the parameter storage section, executing the operation commands and thereby controlling the feed mechanism; and a data changing section for changing at least either the NC program stored in the program storage section or the parameters stored in the parameter storage section, characterized in that the controller further has a change information storage section in which change information relating to a changed portion which was changed by the data changing section is stored, and the execution control section is configured to, when executing the operation commands extracted by the program analyzing section, check, on the basis of the change information stored in the change information storage section, whether the block of each operation command is the block immediately preceding a block relating to the changed portion and, when judging that it is the immediately preceding block, temporarily stops the operation of the feed mechanism before or after the execution of the operation command.

When an NC program stored in the program storage section or a parameter stored in the parameter storage section is changed by the data changing section, change information relating to the changed portion is stored in the change information storage section. It is noted that as the parameter, there can be given, for example, offset amount (tool offset amount) used for tool length compensation, cutter compensation, tool position offset and tool wear compensation, and workpiece origin offset amount.

Thereafter, when the NC program stored in the program storage section is executed, the program analyzing section analyzes the NC program block by block in sequence and extracts operation commands for the feed mechanism, and the execution control section executes, on the basis of the extracted operation commands and the parameters stored in the parameter storage section, the operation commands in sequence, thereby controlling the feed mechanism.

At this time, in the execution control section, when the executed operation commands are executed, a check is made on the basis of the change information stored in the change information storage section as to whether the block of each operation command is the block immediately preceding a block relating to the changed portion, and when it is the immediately preceding block, the operation of the feed mechanism is temporarily stopped before or after the execution of the operation command.

It is noted that, as the mode of re-operating the feed mechanism after the temporary stop, there can be given, as an example, a mode in which the machining is restarted after a machining restart signal which is input by an operator is received by the execution control section.

Thus, according to the controller of the present disclosure, since, in a case where an NC program or a parameter was changed, the operation of the feed mechanism is temporarily stopped before or after the operation command of the block immediately preceding a block relating to the changed portion is executed, it is possible to prompt the operator to check the changed portion. Thereby, even if a command value, a parameter or a code is changed to a wrong or inappropriate value or a wrong code because of an error in changing, it is possible to cause the operator to note that. Therefore, it is possible to prevent the occurrence of a problem that the tool interferes with the workpiece or a machine tool structure and a problem that the accuracy of workpiece machining is reduced.

A configuration is possible in which: the controller has a stop block storage section in which a stop block that means a block for temporarily stopping the operation of the feed mechanism is stored and a block analyzing section which analyzes the block immediately preceding a block relating to the changed portion on the basis of the NC program stored in the program storage section and the change information stored in the change information storage section and checks whether the immediately preceding block relates to a cutting command, and when judging that it does not relate to a cutting command, stores the immediately preceding block as a stop block in the stop block storage section, and when judging that it relates to a cutting command, analyzes the block before the immediately preceding block, recognizes a block which does not relate to a cutting block and is the closest to the block relating to the changed portion, and stores the recognized block as a stop block in the stop block storage section; and the execution control section, when executing the operation commands extracted by the program analyzing section, checks, on the basis of the stop block stored in the stop block storage section, whether the block of each operation command is the stop block, and when judging that it is the stop block, temporarily stops the operation of the feed mechanism before or after the execution of the operation command.

In this case, when the change information is stored in the change information storage section, the block analyzing section analyzes the block immediately preceding a block relating to the changed portion on the basis of the change information and the NC program stored in the program storage section and thereby checks whether the immediately preceding block relates to a cutting command. When it does not relate to a cutting command, the immediately preceding block is stored in the stop block storage section as a stop block, and when it relates to a cutting command, the block before the immediately preceding block is analyzed and a block which does not relate to a cutting command and is the closest to the block relating to the changed portion is recognized, and the recognized block is stored in the stop block storage section as a stop block.

In the execution control section, when the extracted operation commands are executed, a check is made on the basis of the stop block stored in the stop block storage section as to whether the block of the operation command is the stop block. When it is the stop block, the operation of the feed mechanism is temporarily stopped before or after the execution of the operation command.

Thus, a block which does not relate to a cutting command is set as a stop block. Therefore, it is possible to prevent the relative movement of the tool and the workpiece from being temporarily stopped during cutting, and therefore it can be avoided that the accuracy of workpiece machining is reduced by stop of the movement of the tool and the workpiece during cutting.

Further, a configuration is possible in which: the controller has a history information storage section in which history information relating to the NC program stored in the program storage section, the history information including information on whether the NC program has been executed after the change of at least either the NC program or the parameters, and a history-information managing section which monitors the processing in the execution control section and the data changing section, and when an NC program which has not been executed after the change is executed by the execution control section, updates the execution state of the NC program, which is stored in the history information storage section, to "Executed", and when at least either an NC program or a parameter is changed by the data changing section, updates the execution state of the corresponding NC program, which is stored in the history information storage section, to "Not Executed"; and the execution control section is configured to, when executing the operation commands extracted by the program analyzing section, check, on the basis of the history information stored in the history information storage section, whether the executed NC program has been executed after the change, and when judging that it has not been executed after the change, temporarily stop the operation of the feed mechanism before or after the execution of the operation command of a predetermined block.

In this case, when an NC program which has not been executed after change is executed by the execution control section, the execution state of the NC program, which is stored in the history information storage section, is updated by the history-information managing section to "Executed", and when at least either an NC program or an parameter is changed by the data changing section, the execution state of the corresponding NC program, which is stored in the history information storage section, is updated by the history-information managing section to "Not Executed".

Further, in the execution control section, when the extracted operation commands are executed, a check is made on the basis of the history information stored in the history information storage section as to whether the executed NC program has been executed after the change, and when it has not been executed after the change, the operation of the feed mechanism is temporarily stopped before or after the execution of the operation command of a predetermined block.

As described above, it is possible to temporarily stop the machining immediately before a block relating to the changed portion only at the time of the first execution after the change of NC program or parameter and not to temporarily stop the machining at the times of the second and subsequent executions. Therefore, it can be avoided that the machining is temporarily stopped immediately before a block relating to the changed portion every execution, which results in inefficient workpiece machining Furthermore, a configuration is possible in which: the controller has screen display means, and a display control section for displaying on the display means the NC program which is being executed by the execution control section; and the display control section displays, when displaying the NC program which is being executed by the execution control section, the changed portion in a manner different from the manner of displaying other portions on the basis of the change information stored in the change information storage section.

In this case, since, when the NC program being executed by the execution control section is displayed on the display means by the display control section, the changed portion is displayed in a manner different from the manner of displaying other portions on the basis of the change information stored in the change information storage section, the operator can easily recognize the changed portion. It is noted that, as the different manner, there can be given, for example, displaying a block relating to the changed portion in a blinking manner, displaying it in a different color, reverse displaying it.

As described above, according to the controller of the present disclosure, since, when an NC program or a parameter is changed, the operation of the feed mechanism is temporarily stopped immediately before a block relating to the changed portion, thereby causing the operator to take care, it is possible to machine a workpiece with safety without reducing the machining accuracy.

DESCRIPTION OF EMBODIMENTS

Hereinafter, a specific embodiment of the present disclosure will be described on the basis of the accompanying drawings.

Figure 1:
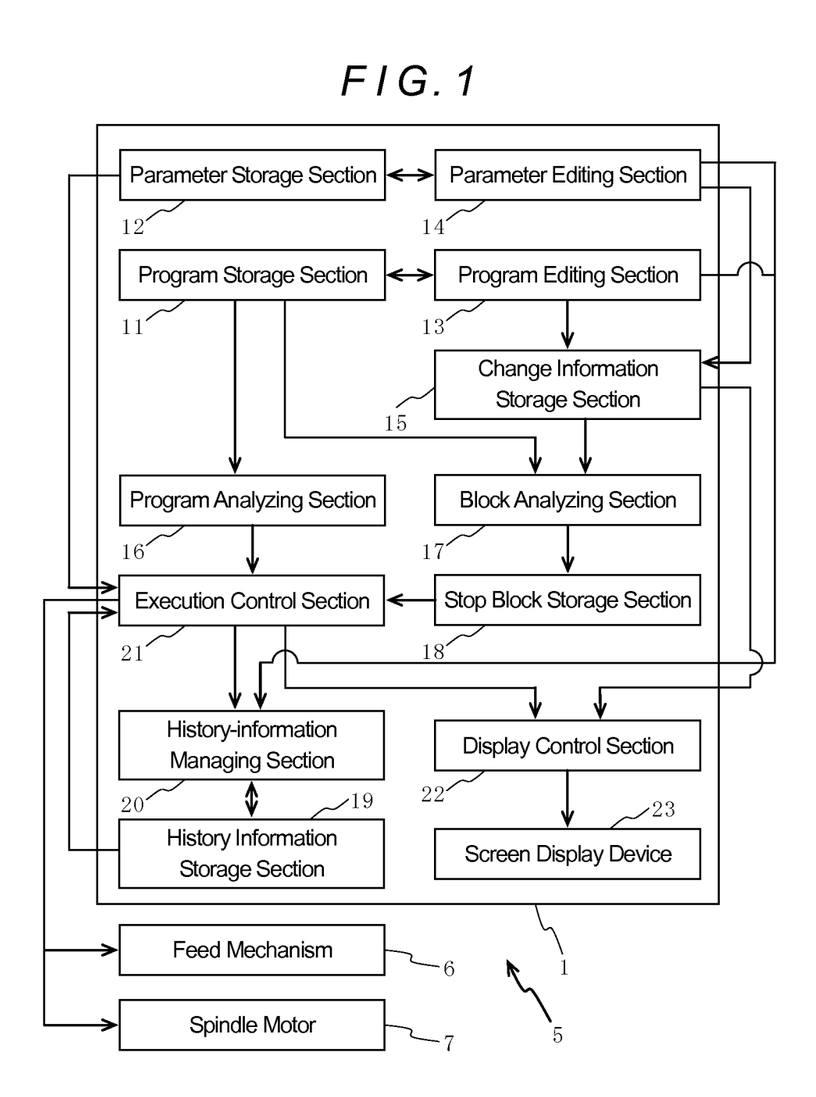
FIG. 1 is a block diagram showing a schematic configuration of a controller for a machine tool and other components according to one embodiment of the present disclosure.

As shown in FIG. 1, a controller 1 of the embodiment has a program storage section 11, a parameter storage section 12, a program editing section 13, a parameter editing section 14, a change information storage section 15, a program analyzing section 16, a block analyzing section 17, a stop block storage section 18, a history information storage section 19, a history-information managing section 20, an execution control section 21, a display control section 22, a screen display device 23, an input device (not shown) and other components, and is provided on a machine tool 5 configured with a feed mechanism 6 for relatively moving a tool and a workpiece in three orthogonal directions, X-axis, Y-axis and Z-axis directions, and a spindle device for holding the tool or the workpiece and rotating the held tool or workpiece about its axis by means of a spindle motor 7.

An NC program is stored in the program storage section 11, and parameters for codes configuring an NC program are stored in the parameter storage section 12. It is noted that, as specific examples of the parameters, there can be given offset amount (tool offset amount) used for tool length compensation, cutter compensation, tool position offset and tool wear compensation, and workpiece origin offset amount, for example.

The program editing section (data changing section) 13 changes the NC program stored in the program storage section 11 on the basis of data input through the input device (not shown). Specifically, the program editing section 13 changes a command value, such as a feed rate, a rotational speed of spindle and a moving position, and a code. In the example shown in FIG. 2, the commanded position in the X-axis direction is changed from −95 to −96 in each of 15 Block, 17 Block and 19 Block.

Figure 3:
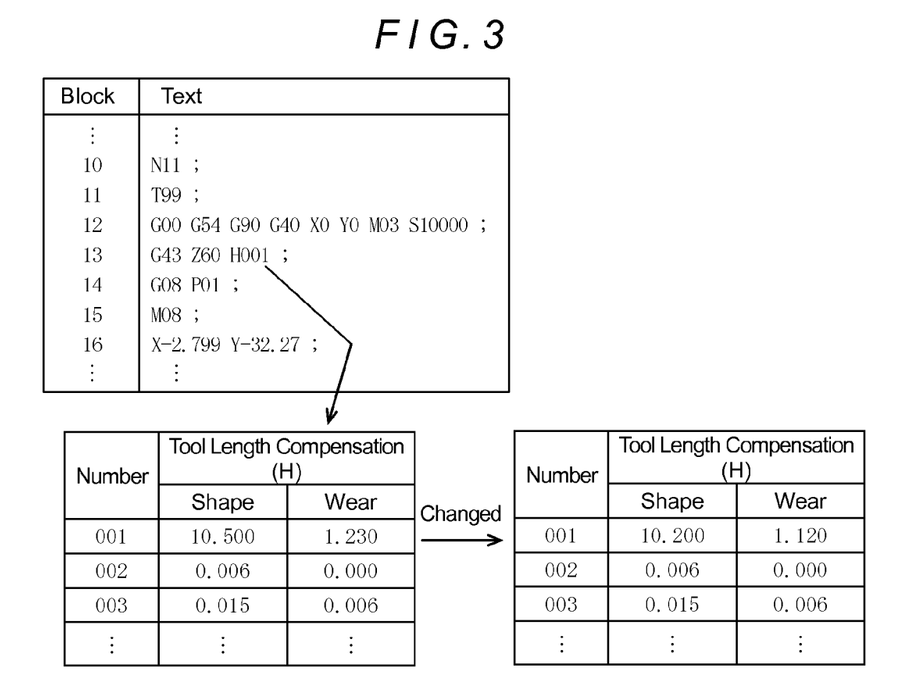
FIG. 3 is an illustration showing an example of changing a parameter.

The parameter editing section (data change section) 14 changes the parameters stored in the parameter storage section 12 on the basis of data input through the input device (not shown). In the example shown in FIG. 3, for a parameter for tool length compensation in 13 Block, the value of the item of "Shape" is changed from 10.500 to 10.200, and the value of the item of "Wear" is changed from 1.230 to 1.120.

In the change information storage section 15, change information relating to a changed portion in the NC program, which was changed by the program editing section 13, and change information relating to a changed portion in the parameters, which was changed by the parameter editing section 14, are stored. The change information includes, for example, information on a block relating to the changed portion, data before the change, data after the change and the like. It is noted that, for a changed portion in the parameters, a block relating to the changed portion means a block including a code (command) which refers to the changed portion in the parameters.

The program analyzing section 16 analyzes the NC program stored in the program storage section 11 block by block in sequence and extracts operation commands for the feed mechanism 6 and for the spindle motor 7. As the operation command for the feed mechanism 6, there can be given commands relating to the feed rates of the tool and the workpiece, the moving position of the tool and the moving position of the workpiece. As the operation command for the spindle motor 7, there can be given commands relating to the rotational speed of spindle, the start of the spindle rotation and the stop of spindle rotation.

The block analyzing section 17 analyzes the block preceding a block relating to the changed portion on the basis of the NC program stored in the program storage section 11 and the change information stored in the change information storage section 15, recognizes a stop block which is a block for temporarily stopping the operations of the feed mechanism 6 and the spindle motor 7, and stores the recognized stop block in the stop block storage section 18. It is noted that, in the stop block storage section 18, a stop block for an NC program which is stored in the program storage section 11 and has a changed portion which was changed by the program editing section 13 or the parameter editing section 14 is stored.

Figure 4:
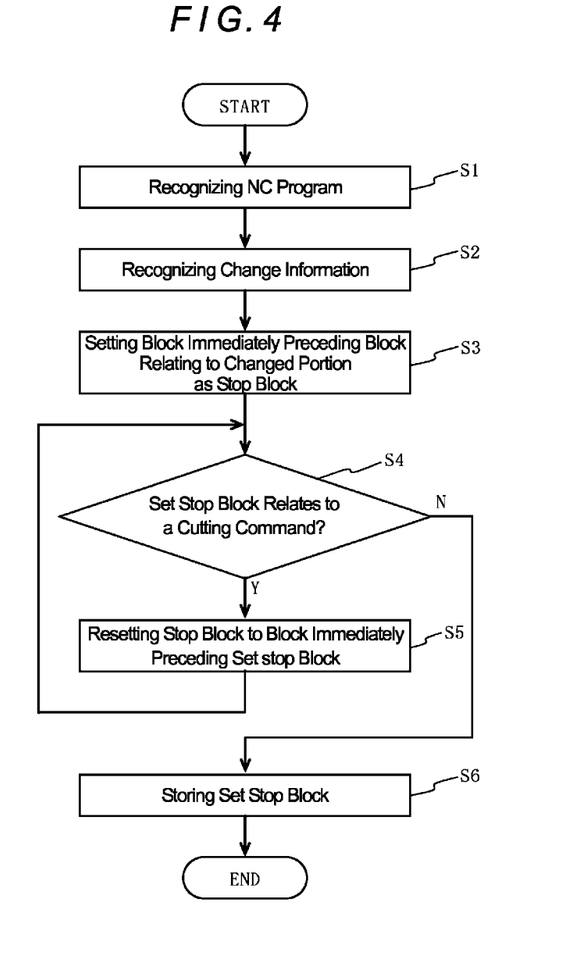
FIG. 4 is a flowchart showing a sequence of processing steps in a block analyzing section of the embodiment.

Specifically, the block analyzing section 17 is configured to execute a sequence of processing steps as shown in FIG. 4. First, the block analyzing section 17 recognizes a changed NC program stored in the program storage section 11 (Step S1) and recognizes the change information stored in the change information storage section 15 (Step S2), and sets the block immediately preceding the block relating to the changed portion as a stop block (Step S3). For example, in the example shown in FIG. 2, 14 Block, 16 Block and 18 Block are each set as a stop block, and in the example shown in FIG. 3, 12 Block is set as a stop block.

Thereafter, the set stop block is analyzed and a check is made whether the stop block relates to a cutting command (Step S4). Whether or not it relates to a cutting command can be judged by judging whether it is a block in which a cutting code is valid.

When a judgment is made that the stop block relates to a cutting command, the stop block is reset to the block immediately preceding the stop block set in Step S3 (Step S5), and the reset stop block is analyzed and a check is made whether it relates to a cutting command (Step S4). In this way, the processing steps in Steps S4 and S5 are repeated until a stop block which does not relate to a cutting command is found out. In the example shown in FIG. 2, since 14 Block and 18 Block each relate to a cutting command, 13 Block and 17 Block are each recognized as a stop block which does not relate to a cutting command.

When a stop block which does not relates to a cutting command is recognized (Step S4), the stop block set in Step S3 or the stop block reset in Step S5 is stored in the stop block storage section 18 (Step S6) and the sequence of processing steps is terminated. In the example shown in FIG. 2, 13 Block, 16 Block and 17 Block are stored in the stop block storage section 18 as stop blocks and, in the example shown in FIG. 3, 12 Block is stored in the stop block storage section 18 as a stop block.

Figure 5:
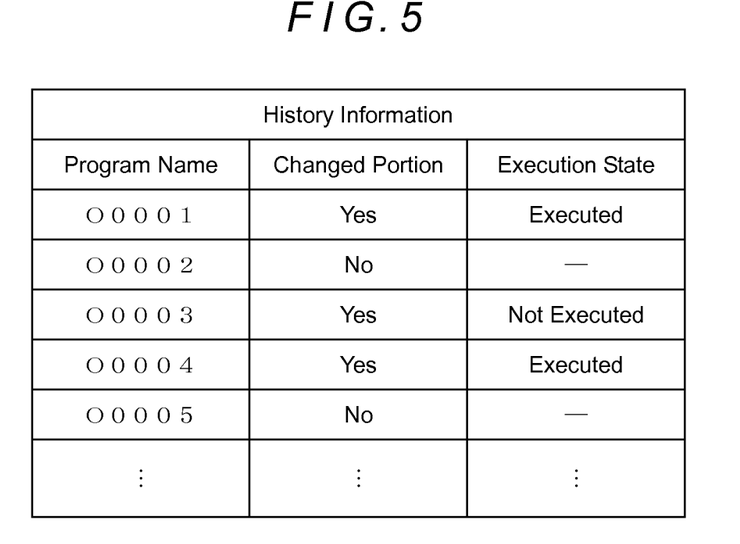
FIG. 5 is a data table showing history information stored in a history information storage section of the embodiment.

In the history information storage section 19, history information relating to NC programs stored in the program storage section 19 is stored. The history information, as shown in FIG. 5, contains information on program name, on whether at least either the NC program or the parameters is changed (whether the NC program has any changed portion), and, when at least either the NC program or the parameters is changed, on whether the NC program has been executed after the change, and these information are related to each other. It is noted that the program name may be a program number as shown in FIG. 5 or other file name.

The history-information managing section 20 monitors the processing in the program editing section 13, the parameter editing section 14 and the execution control section 21. Once all of the blocks of an NC program which has not been executed after the change are executed by the execution control section 21, the execution state of the NC program, which is stored in the history-information storage section 19, is updated to "Executed". When an NC program stored in the program storage section 11 is changed by the program editing section 13 or a parameter stored in the parameter storage section 12 is changed by the parameter editing section 14, the execution state of the corresponding NC program, which is stored in the history information storage section 19, is updated to "Not Executed". Further, when a new NC program is stored in the program storage section 11, the history-information managing section 20 generates history information relating to the new NC program and stores the information in the history information storage section 19.

The execution control section 21 executes, on the basis of the operation commands extracted in sequence by the program analyzing section 16 and the parameters stored in the parameter storage section 12, the operation commands and thereby controls the feed mechanism 6 and the spindle motor 7.

Figure 6:
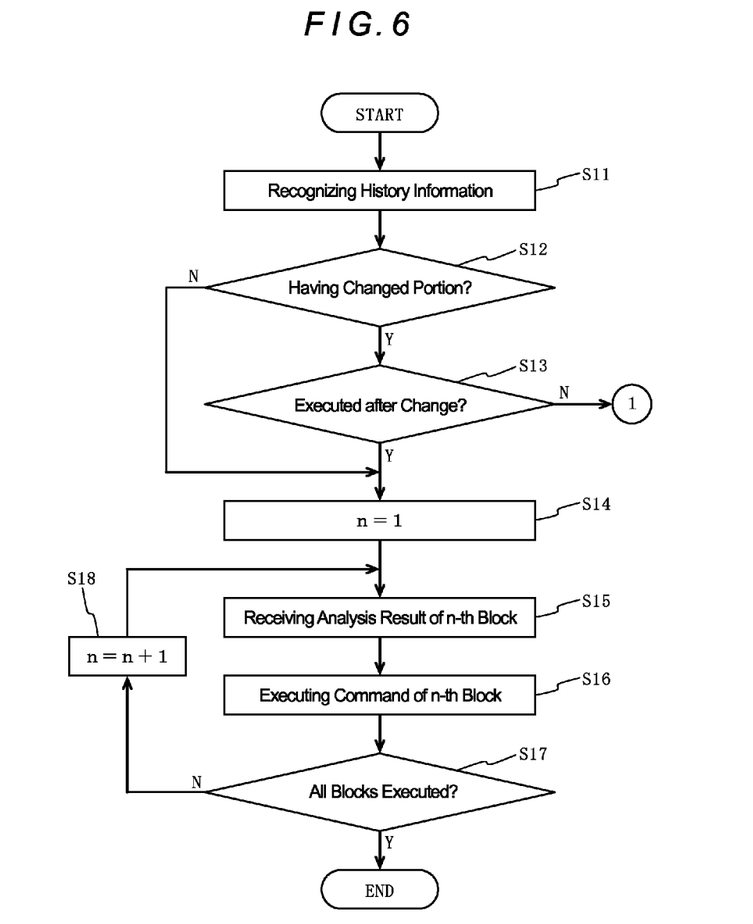
FIG. 6 is a flowchart showing a sequence of processing steps in an execution control section of the embodiment.
Figure 7:
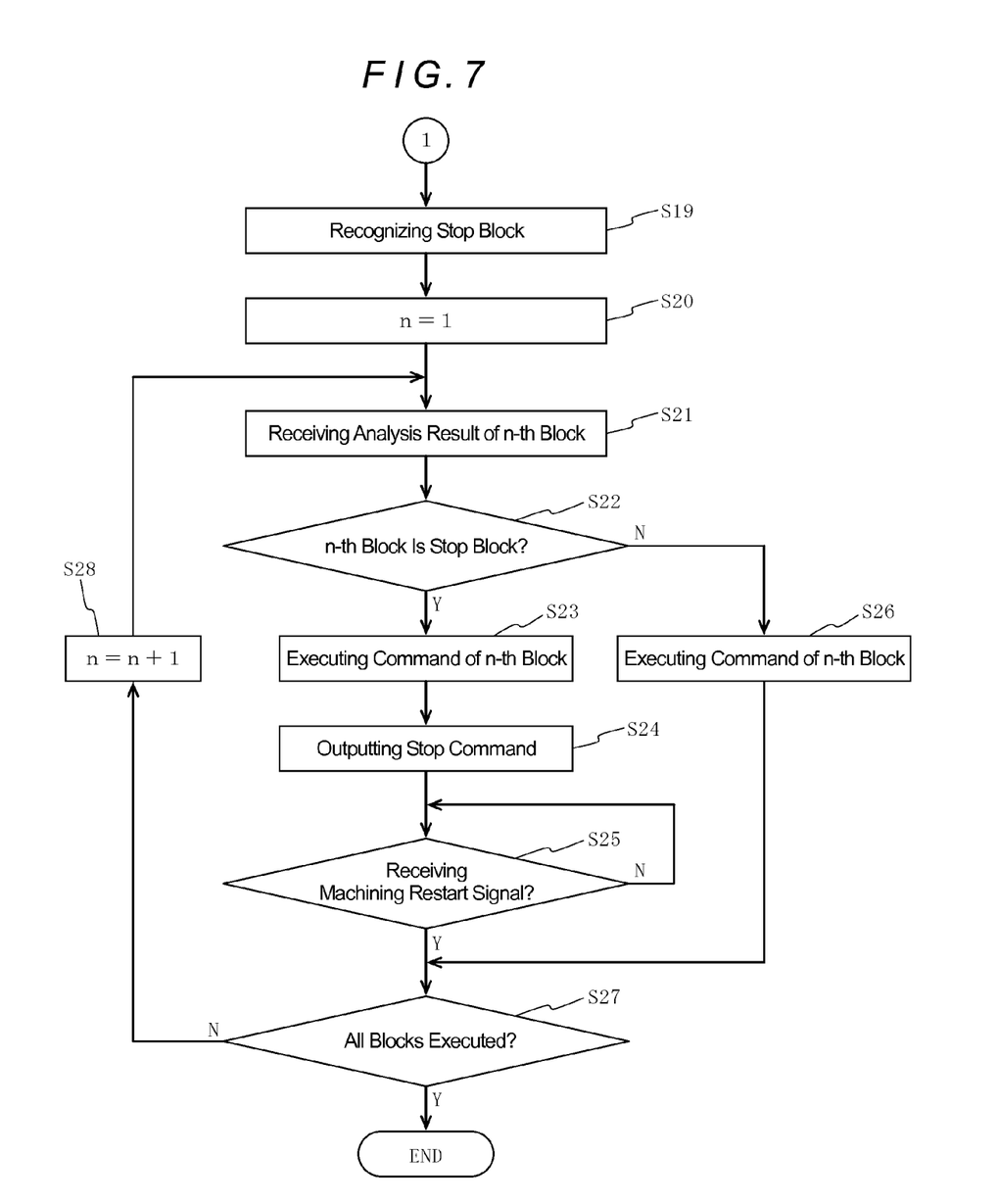
FIG. 7 is a flowchart showing a sequence of processing steps in the execution control section of the embodiment.

Specifically, the execution control section 21 is configured to execute a sequence of processing steps as shown in FIGS. 6 and 7. First, the execution control section 21 recognizes the history information stored in the history information storage section 19 (Step S11) and checks, on the basis of the recognized history information, whether an NC program to be executed has any changed portion (Step S12). When judging that the NC program to be executed has any changed portion (for example, in FIG. 5, when the program name of the NC program to be executed is O0001, O0003 or O0004), the execution control section 21 further checks whether the NC program to be executed has been executed after the change (Step S13).

When a judgment is made that the NC program has been executed after the change (for example, in FIG. 5, when the program name of the NC program is O0001 or O 0004), and when in Step S12 a judgment is made that the NC program has no changed portion (for example, in FIG. 5, when the program name of the NC program is O0002 or O0005), the execution control section 21 sets a counter n to n=1 (Step S14), receives the operation command of the n-th block from the program analyzing section 16 (Step S15), and executes the received operation command (Step S16). Thereafter, a check is made whether the operation commands of all of the blocks of the NC program have been executed (Step S17). After the operation commands of all of the blocks are executed while the counter n is updated (Steps S17, S18), the sequence of processing steps is terminated.

On the other hand, when in Step S13 a judgment is made that the NC program has not been executed after the change (for example, in FIG. 5, when the program name of the NC program is O0003), the execution control section 21 recognizes the stop block stored in the stop block storage section 18 (Step S19), sets the counter n to n=1 (Step S20), receives the operation command of the n-th block from the program analyzing section 16 (Step S21), and checks, on the basis of the recognized stop block, whether the n-th block is the stop block (Step S22).

When judging that the n-th block is the stop block, the execution control section 21 executes the received operation command (Step S23), and then outputs a stop command and temporarily stops the operations of the feed mechanism 6 and the spindle motor 7 (Step S24). For example, in the example shown in FIG. 2, the operations of the feed mechanism 6 and the spindle motor 7 are temporarily stopped after the operation command of 13 Block is executed, after the operation command of 16 Block is executed and after the operation command of 17 Block is executed, and in the example shown in FIG. 3, the operations of the feed mechanism 6 and the spindle motor 7 are temporarily stopped after the operation command of 12 Block is executed.

Thereafter, a machining restart signal is input by the operator through the input device (not shown), and this signal is received (Step S25) and then the processing proceeds to Step S27. On the other hand, when in Step S22 a judgment is made that the n-th block is not the stop block, the received operation command is executed (Step S26) and the processing proceeds to Step S27.

In the Step S27, a check is made whether the operation commands of all of the blocks of the NC program have been executed. After the operation commands of all of the blocks of the NC program are executed while the counter n is updated (Steps S27, S28), the sequence of processing steps is terminated.

The display control section 22 displays on the screen display device 23 an NC program being executed by the execution control section 21. Further, the display control section 22, when displaying an NC program, displays a changed portion in a manner different from the manner of displaying other portions on the basis of the change information stored in the change information storage section 15.

Figure 2:
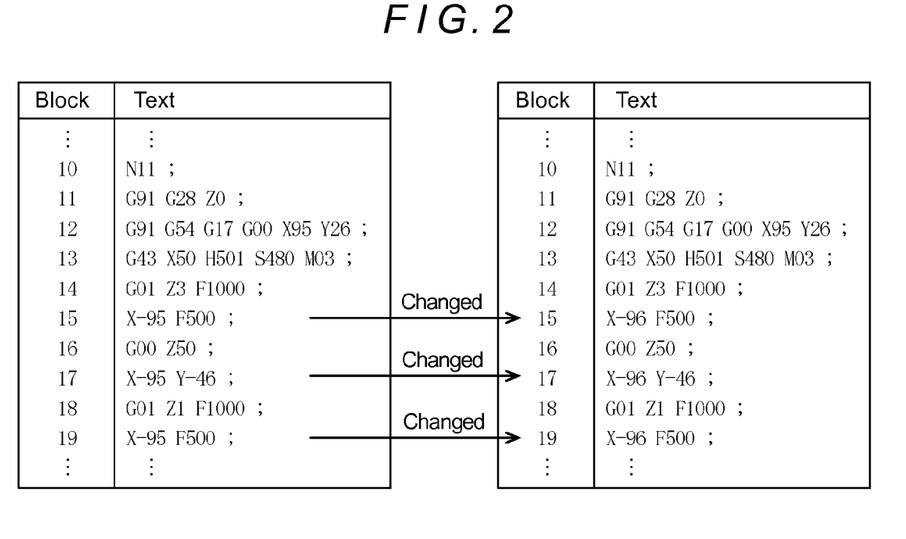
FIG. 2 is an illustration showing an example of changing an NC program.
Figure 8:
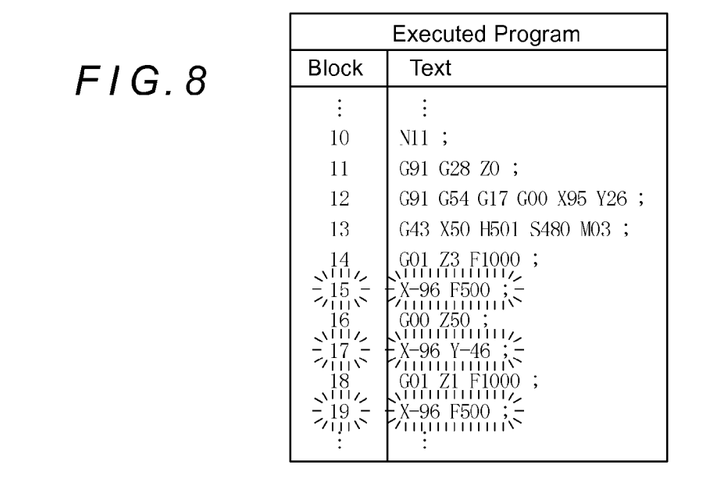
FIG. 8 is an illustration showing a part of a picture displayed by a display control section of the embodiment.

Here, an explanation is made using the NC program shown in FIG. 2 as an example. For example, as shown in FIG. 8, 15 Block, 17 Block and 19 Block, which are blocks relating to the changed portion, are displayed in a blinking manner. Alternatively, 15 Block, 17 Block and 19 Block may be displayed in a different color or may be reverse displayed.

According to the controller 1 of the embodiment thus configured, when an NC program stored in the program storage section 11 is changed by the program editing section 13 and when a parameter stored in the parameter storage section 12 is changed by the parameter editing section 14, change information relating to the changed portion is stored in the change information storage section 15 and the execution state of the corresponding NC program, which is stored in the history information storage section 19, is updated to "Not Executed" by the history-information managing section 20.

Further, blocks before a block relating to the changed portion are analyzed by the block analyzing section 17 on the basis of the NC program stored in the program storage section 11 and the change information stored in the change information storage section 15, and a block which does not relates to a cutting command and which is the closest to the block relating to the changed portion is stored in the stop block storage section 18 as a stop block.

Thereafter, the program analyzing section 16 analyzes the NC program stored in the program storage section 11 block by block in sequence and extracts operation commands for the feed mechanism 6 and the spindle motor 7, and the execution control section 21 executes, on the basis of the extracted operation commands and the parameters stored in the parameter storage section 12, the operation commands in sequence and thereby controls the feed mechanism 6 and the spindle motor 7.

At this time, in the execution control section 21, initially, a check is made on the basis of the history information stored in the history information storage section 19 as to whether the NC program to be executed has been executed after the change. When a judgment is made that the NC program has not been executed after the change, the operations of the feed mechanism 6 and the spindle motor 7 are temporarily stopped after the operation command of the stop block stored in the stop block storage section 18 is executed. On the other hand, when the NC program has no changed portion and when, even if the NC program has any changed portion, a judgment is made that the NC program has been executed after the change, the operation commands are executed in sequence without the operations of the feed mechanism 6 and the spindle motor 7 being temporarily stopped.

Further, the NC program being executed by the execution control section 21 is displayed on the screen display device 23 by the display control section 22, and the changed portion recognized on the basis of the change information stored in the change information storage section 15 is displayed in a manner different from the manner of displaying other portions.

It is noted that once all of the blocks of an NC program which has not been executed after the change are executed by the execution control section 21, the execution state of the NC program, which is stored in the history information storage section 19, is updated to "Executed" by the history-information managing section 20.

Thus, according to the controller 1 of the embodiment, when an NC program or a parameter is changed, the operations of the feed mechanism 6 and the spindle motor 7 are temporarily stopped after the operation command of the block immediately preceding a block relating to the changed portion is executed. Therefore, it is possible to prompt the operator to check the changed portion. Thereby, even if a command value, a parameter or a code is changed to a wrong or inappropriate value or a wrong code because of an error in changing, it is possible to cause the operator to note that. Therefore, it is possible to prevent the occurrence of a problem that the tool interferes with the workpiece or a machine tool structure and a problem that the accuracy of workpiece machining is reduced.

Further, since, when the block immediately preceding a block relating to the changed portion relates to a cutting command, the operations of the feed mechanism 6 and the spindle motor 7 are temporarily stopped after a block which does not relate to a cutting command and is the closest to the block relating to the change portion is executed, it is possible to prevent the relative movement of the tool and the workpiece or the rotation of the spindle from being temporarily stopped during cutting, and therefore it can be avoided that the accuracy of workpiece machining is reduced by the stop of the movement of the tool and the workpiece or the stop of the rotation of the spindle during cutting.

Further, since, once all of the blocks of an NC program which has not been executed after change are executed by the execution control section 21, the execution state of the NC program, which is stored in the history information storage section 19, is updated to "Executed" by the history-information managing section 20, it is possible to temporarily stop the machining immediately before a block relating to the changed portion only at the time of the first execution after the change of NC program or parameter and not to temporarily stop the machining at the times of the second and subsequent executions. Therefore, it can be avoided that the machining is temporarily stopped immediately before a block relating to the changed portion every execution, which results in inefficient workpiece machining. Additionally, since the execution state is updated after all of the blocks of the NC program are executed, it can be avoided that the execution state is updated even when the execution of the NC program is interrupted, and the execution state is therefore updated in a state where all changed portions have not been executed.

Furthermore, since, when an NC program being executed by the execution control section 21 is displayed on the screen display device 23 by the display control section 22, the changed portion is displayed in a manner different from the manner of displaying other portions on the basis of the change information stored in the change information storage section 15, the operator can easily recognize the changed portion.

Thus, one embodiment of the present disclosure has been described. However, a specific embodiment in which the present invention can be implemented is not limited thereto.

Figure 9:
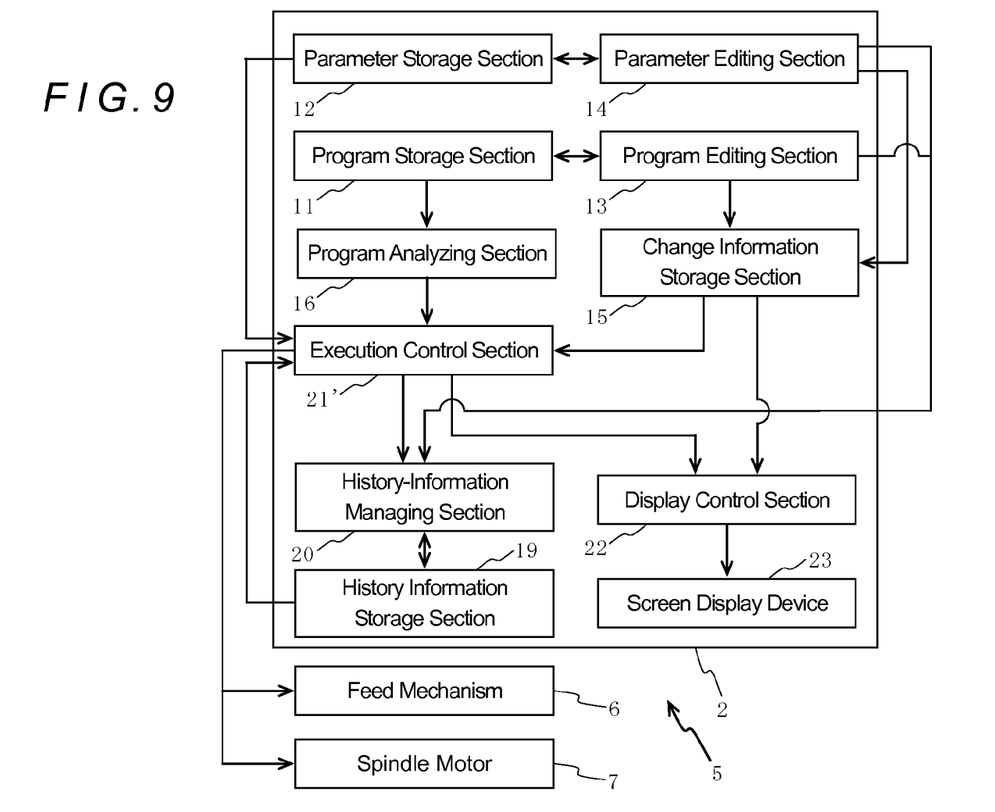
FIG. 9 is a block diagram showing an schematic configuration of an controller for a machine tool and other component according to another embodiment of the present disclosure.

For example, the block analyzing section 17 and the stop block storage section 18 of the controller 1 in FIG. 1 can be omitted, and a controller 2 in which they are omitted has, as shown in FIG. 9, a program storage section 11, a parameter storage section 12, a program editing section 13, a parameter editing section 14, a change information storage section 15, a program analyzing section 16, a history information storage section 19, a history-information managing section 20, and execution control section 21', a display control section 22, a screen display device 23 and an input device (not shown). The controller 2 is different from the controller 1 in that the block analyzing section 17 and the stop block storage section 18 are omitted in the controller 2 and in that the execution control section 21' is provided instead of the execution control section 21.

The execution control section 21' executes, on the basis of operation commands executed by the program analyzing section 16 in sequence, parameters stored in the parameter storage section 12 and change information stored in the change information storage section 15, the operation commands and thereby controls the feed mechanism 6 and the spindle motor 7.

Figure 10:
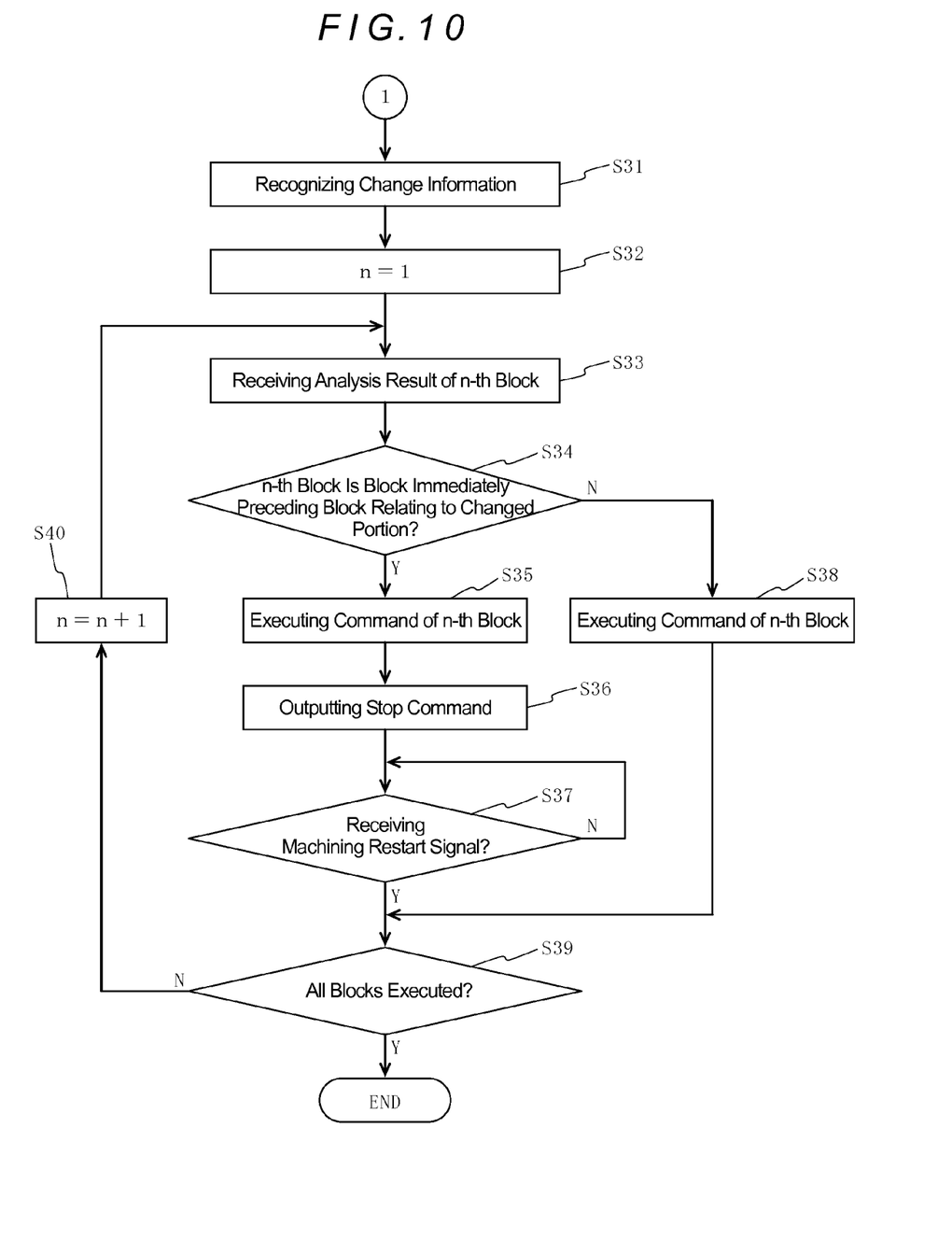
FIG. 10 is a flowchart showing a sequence of processing steps in an execution control section of another embodiment of the present disclosure.

Specifically, the execution control section 21' is configured to execute a sequence of processing steps as shown in FIGS. 6 and 10. Since the execution control section 21' executes similar processing to that of the execution control section 21 for Steps S11 to S18, the explanation thereof is omitted and Step 31 and subsequent steps will be described hereinafter.

That is, when, in Step S13, judging that the NC program to be executed has not been executed after the change, the execution control section 21' recognizes the change information stored in the change information storage section 15 (Step S31), sets a counter n to n=1 (Step S32), receives the operation command of the n-th block from the program analyzing section 16 (Step S33), and checks, on the basis of the recognized change information, whether the n-th block is the block immediately preceding a block relating to the changed portion (Step S34). For example, in the example shown in FIG. 2, a check is made whether the n-th block corresponds to 14 Block, 16 Block or 18 Block, and in the example shown in FIG. 3, a check is made whether the n-th block corresponds to 12 Block.

When judging that the n-th block is the immediately preceding block, the received operation command is executed (Step S35), and then a stop command is output and the operations of the feed mechanism 6 and the spindle motor 7 are temporarily stopped (Step S36). Thereafter, a machining restart signal input by the operator through the input device (not shown) is received (Step S37) and the processing proceeds to Step S39. On the other hand, when, in Step S34, judging that the n-th block is not the immediately preceding block, the received operation command is executed (Step S38) and the processing proceeds to Step S39.

In Step S39, a check is made whether the operation commands of all of the blocks of the NC program have been executed. After the operation commands of all of the blocks of the NC program are executed while the counter n is updated (Steps S39, S40), the sequence of processing steps is terminated.

Also when the controller 2 is thus configured, since the operations of the feed mechanism 6 and the spindle motor 7 are temporarily stopped after the operation command of the block immediately preceding a block relating to a changed portion of the NC program or a changed portion of a parameter is executed, a similar effect to that of the above controller 1 can be obtained.

Further, although the controllers 1, 2 are configured to temporarily stop the operations of the feed mechanism 6 and the spindle motor 7 after executing the operation command of a predetermined block, there is no limitation and a configuration is possible in which the operations of the feed mechanism 6 and the spindle motor 7 are temporarily stopped before the operation command of a predetermined block is executed and, after the machining restart signal is received, the machining is restarted and the operation command of the predetermined block is executed.

What is claimed is:

1. A controller for a machine tool controlling a feed mechanism which relatively moves a tool and a workpiece, comprising:
   a program storage section in which a numerical control program is stored;
   a parameter storage section in which parameters for codes configuring the numerical control program are stored;
   a program analyzing section for analyzing the numerical control program stored in the program storage section block by block in sequence and extracting operation commands for the feed mechanism;
   an execution control section for, on the basis of the operation commands extracted by the program analyzing section in sequence and the parameters stored in the parameter storage section, executing the operation commands and thereby controlling the feed mechanism; and
   a data changing section for changing at least either the numerical control program stored in the program storage section or the parameters stored in the parameter storage section;
   wherein the controller further has a change information storage section in which change information relating to a changed portion which was changed by the data changing section is stored; and
   wherein the execution control section is configured to, when executing the operation commands extracted by the program analyzing section and based on the change information stored in the change information storage section, check whether the block of each operation command immediately precedes a block relating to the changed portion and, when judging that it is the immediately preceding block, temporarily stops the operation of the feed mechanism before or after the execution of the operation command.

2. The controller of claim 1, wherein:
   the controller has a stop block storage section in which a stop block that means a block for temporarily stopping the operation of the feed mechanism is stored, and a block analyzing section which analyzes the block immediately preceding a block relating to the changed portion on the basis of the numerical control program stored in the program storage section and the change information stored in the change information storage section and checks whether the immediately preceding block relates to a cutting command, and when judging that it does not relate to a cutting command, stores the immediately preceding block in the stop block storage section as a stop block, and when judging that it relates to a cutting command, analyzes the block before the immediately preceding block, recognizes a block which does not relate to a cutting block and is the closest to the block relating to the changed portion, and stores the recognized block in the stop block storage section as a stop block, and
   the execution control section is configured to, when executing the operation commands extracted by the program analyzing section, check, on the basis of the stop block stored in the stop block storage section, whether the block of each operation command is the stop block, and when judging that it is the stop block, temporarily stop the operation of the feed mechanism before or after the execution of the operation command.

3. The controller for machine tool according to claim 1, wherein:
   the controller has a history information storage section in which history information relating to the numerical control program stored in the program storage section, the history information including information on whether the numerical control program has been executed after the change of at least either the numerical control program or the parameters, and a history-information managing section which monitors the processing in the execution control section and the data changing section, and when an numerical control program which has not been executed after the change is executed by the execution control section, updates the execution state of the numerical control program, which is stored in the history information storage section, to "executed", and when at least either the numerical control program or the parameters are changed by the data changing section, updates the execution state of the corresponding numerical control program, which is stored in the history information storage section, to "not executed", and
   the execution control section is configured to, when executing the operation commands extracted by the program analyzing section, check, on the basis of the history information stored in the history information storage section, whether the executed numerical control program has been executed after the change, and when judging that it has not been executed after the change, temporarily stop the operation of the feed mechanism before or after the execution of the operation command of a predetermined block.

4. The controller for machine tool according to any one of claim 1, wherein
   the controller has screen display means, and a display control section for displaying on the display means the numerical control program which is being executed by the execution control section, and the display control section displays, when displaying the numerical control program which is being executed by the execution control section, the changed portion in a manner different from the manner of displaying other portions on the basis of the change information stored in the change information storage section.

\* \* \* \* \*